Aug. 28, 1928.

S. I. VAUGHN 1,682,202

BEAM

Filed June 8, 1927

INVENTOR
STANLEY I. VAUGHN.
BY
ATTORNEY

Patented Aug. 28, 1928.

1,682,202

UNITED STATES PATENT OFFICE.

STANLEY I. VAUGHN, OF HEMPSTEAD, NEW YORK, ASSIGNOR TO CURTISS AEROPLANE & MOTOR COMPANY, INC., A CORPORATION OF NEW YORK.

BEAM.

Application filed June 8, 1927. Serial No. 197,274.

My invention relates to beams or the like.

An object of the invention is to provide a beam or the like which is built up from a plurality of parts; which is inexpensive and easy to assemble; which is light, tho strong; and which in its assembled condition is preferably of I-section and is preferably constructed of metal throughout.

In the drawings, wherein like reference characters denote like or corresponding parts, Fig. 1 is a side elevation of a portion of the turtle-back of an aeroplane fuselage having the supporting frame members thereof constructed in the form herein disclosed;

In the embodiment of the invention selected for illustration, a portion of an aeroplane fuselage 10 is shown. Such fuselage portion preferably consists of a turtle-back 11 comprising transverse frame members 12, and longitudinal frame members 13. The transverse frame members 12 herein shown are preferably of built-up construction. Said frame members typify a single instance in which a beam of the character herein disclosed may be advantageously employed. The invention, however, is susceptible of use in various other connections and in fact may be used in any capacity where a strong, tho light, beam or the like is required.

Figure 1:
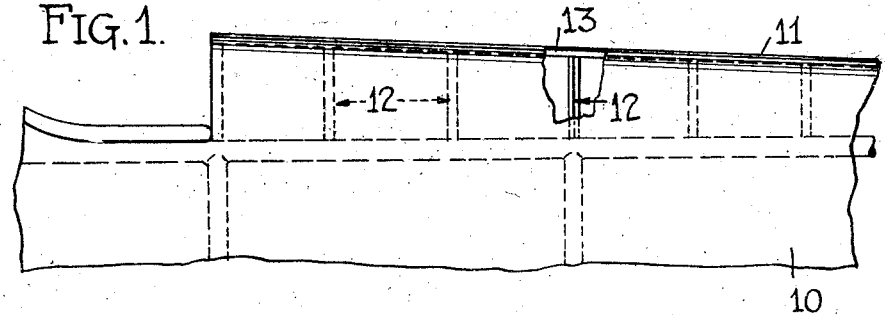
Figure 2:
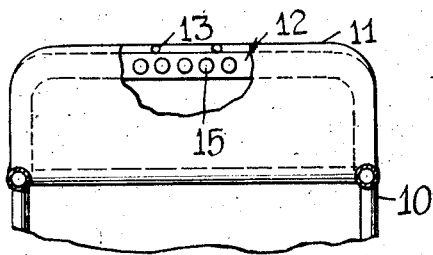
Fig. 2 is an end elevation of the structure illustrated in Fig. 1.
Figures 3, 4:
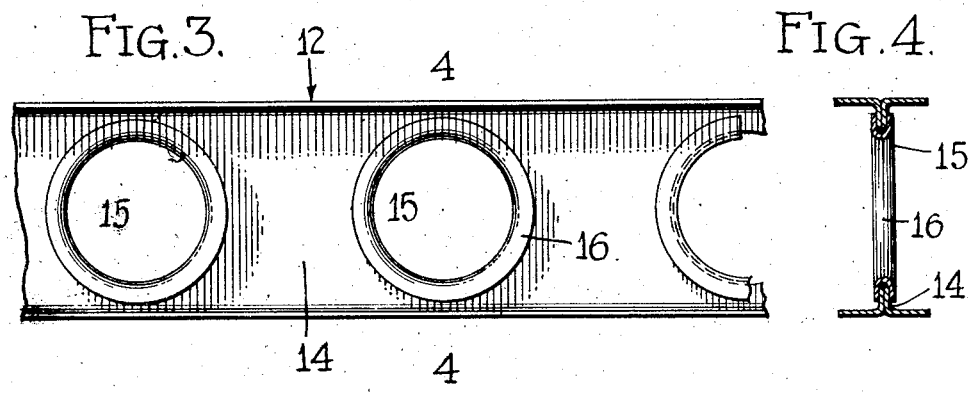
Fig. 3 is a side elevation of the beam or the like per se.
Fig. 4 is a section on the line 4—4 of Fig. 3.
Figure 5:
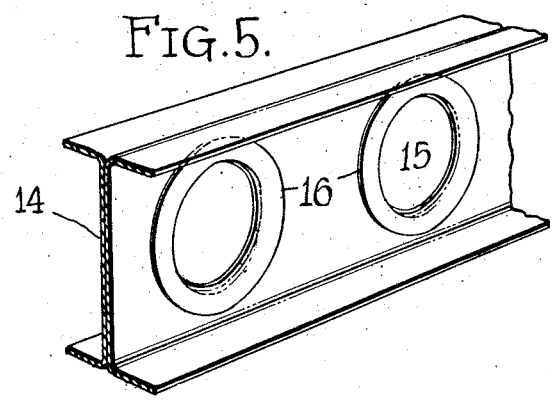
Fig. 5 is a perspective view of said beam.

In Figs. 3 to 5, inclusive, of the drawings wherein the details of the beam construction are clearly illustrated, 14—14 designate separate beam parts of channel section. The web portion of each said channel part has formed therein one or more lightening holes 15 which, in the assembled condition of the beam are adapted to register or coincide. The web portion of each said channel part, in the assembly of the beam, are arranged back to back to thus constitute or give it, the beam, a true I-section. Within the aligned lightening holes 15 short tubular members 16 are fitted. These tubular members have originally a substantially constant cross-section throughout and when fitted within said lightening holes are adapted to project laterally beyond the outside faces of the engaging webs. When thus positioned, such laterally extending or overhanging portions are bent or pressed down and upon said web portions to tightly clamp the engaging beams parts together. Any suitable die press, if desired, may be used to perform this function. Thus constructed and assembled an inexpensive light and strong metal I-beam, especially useful in aircraft structures, is the result.

While I have described my invention in detail in its present preferred embodiment, it will be obvious to those skilled in the art after understanding my invention that various changes and modifications may be made therein without departing from the spirit or scope thereof. I aim in the appended claims to cover all such modifications and changes.

What I claim is:

1. A solid metal beam or the like of true I-section comprising two beam parts, each of channel section, and each including marginal flanges and a web portion, the web portions of the beam parts, from one to the other of the marginal flanges thereof, bearing flatwise directly one against the other and having formed therein lightening holes, and members engaging in and extending thru said aligned lightening holes and bearing respectively on the outside faces of the engaging webs to fasten said beam parts together.

2. A solid metal beam or the like of true I-section comprising two beam parts, each of channel section, and each including marginal flanges and a web portion, the web portions of the beam parts from one to the other of the marginal flanges thereof, bearing flatwise directly one against the other and having formed therein aligned lightening holes, and members engaging in and extending thru said aligned lightening holes and bearing respectively on the outside faces of the engaging flat webs, said means constituting the sole means of fastening and holding said beam parts and hence the I-beams together.

In testimony whereof I hereunto affix my signature.

STANLEY I. VAUGHN.